United States Patent [19]

Chang

[11] 4,418,322
[45] Nov. 29, 1983

[54] AUTOMATIC DIGITAL CIRCUIT FOR SYNCHRONIZING WITH A VARIABLE BAUD RATE GENERATOR

[75] Inventor: Paul S. Chang, Harrisburg, Pa.

[73] Assignee: AMP Incorporated, Harrisburg, Pa.

[21] Appl. No.: 345,964

[22] Filed: Feb. 5, 1982

Related U.S. Application Data

[63] Continuation-in-part of Ser. No. 137,038, Apr. 3, 1980, abandoned.

[51] Int. Cl.³ .................................................. H03L 7/18
[52] U.S. Cl. ..................................... 331/1 A; 331/16; 331/25; 331/49
[58] Field of Search .................... 331/1 A, 16, 18, 25, 331/49; 370/100

[56] References Cited

U.S. PATENT DOCUMENTS

| | | | |
|---|---|---|---|
| 3,758,720 | 9/1973 | Dinn | 328/155 X |
| 3,891,939 | 6/1975 | Bennett et al. | 331/1 A |
| 3,893,033 | 7/1975 | Finch | 328/63 |
| 3,903,473 | 9/1975 | Foster | 328/29 |
| 3,913,028 | 10/1975 | Bosselears | 331/1 A |
| 4,011,520 | 3/1977 | Schaefer | 331/14 |

*Primary Examiner*—Siegfried H. Grimm
*Attorney, Agent, or Firm*—Donald M. Boles

[57] ABSTRACT

Electronic switching means for synchronizing a voltage controlled oscillator output with a variable input Baud Rate Clock. A Baud rate counter ratio input to a Phase Lock Loop circuit is selected or electronically switched automatically according to the input signal Baud rate. Binary counters count down a clock during the time an input signal is high, and the result of the count is transferred to an output register which controls, on the basis of the count, the electronic switching of a Baud rate counter to select the appropriate counter ratio output.

4 Claims, 4 Drawing Figures

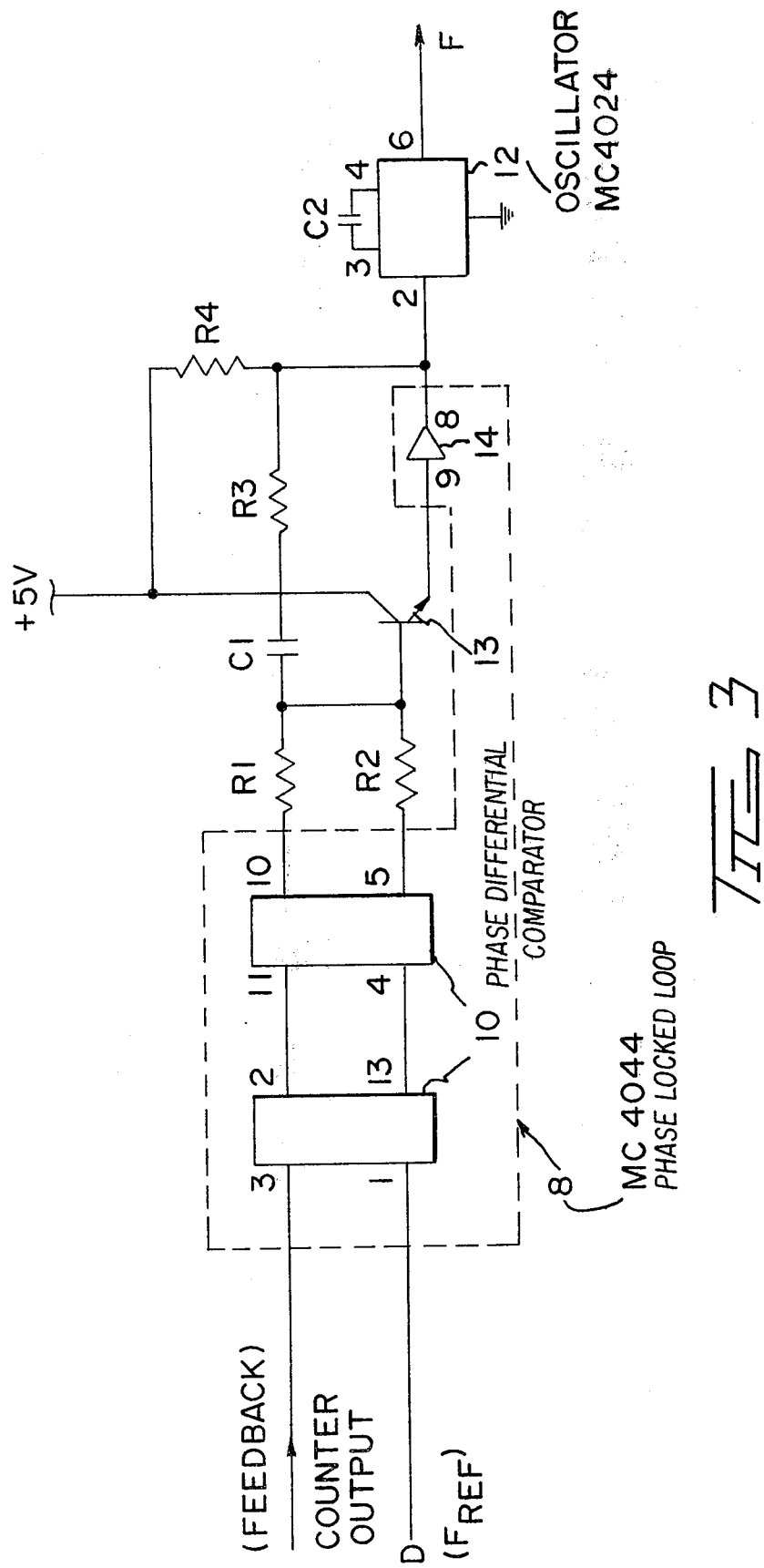

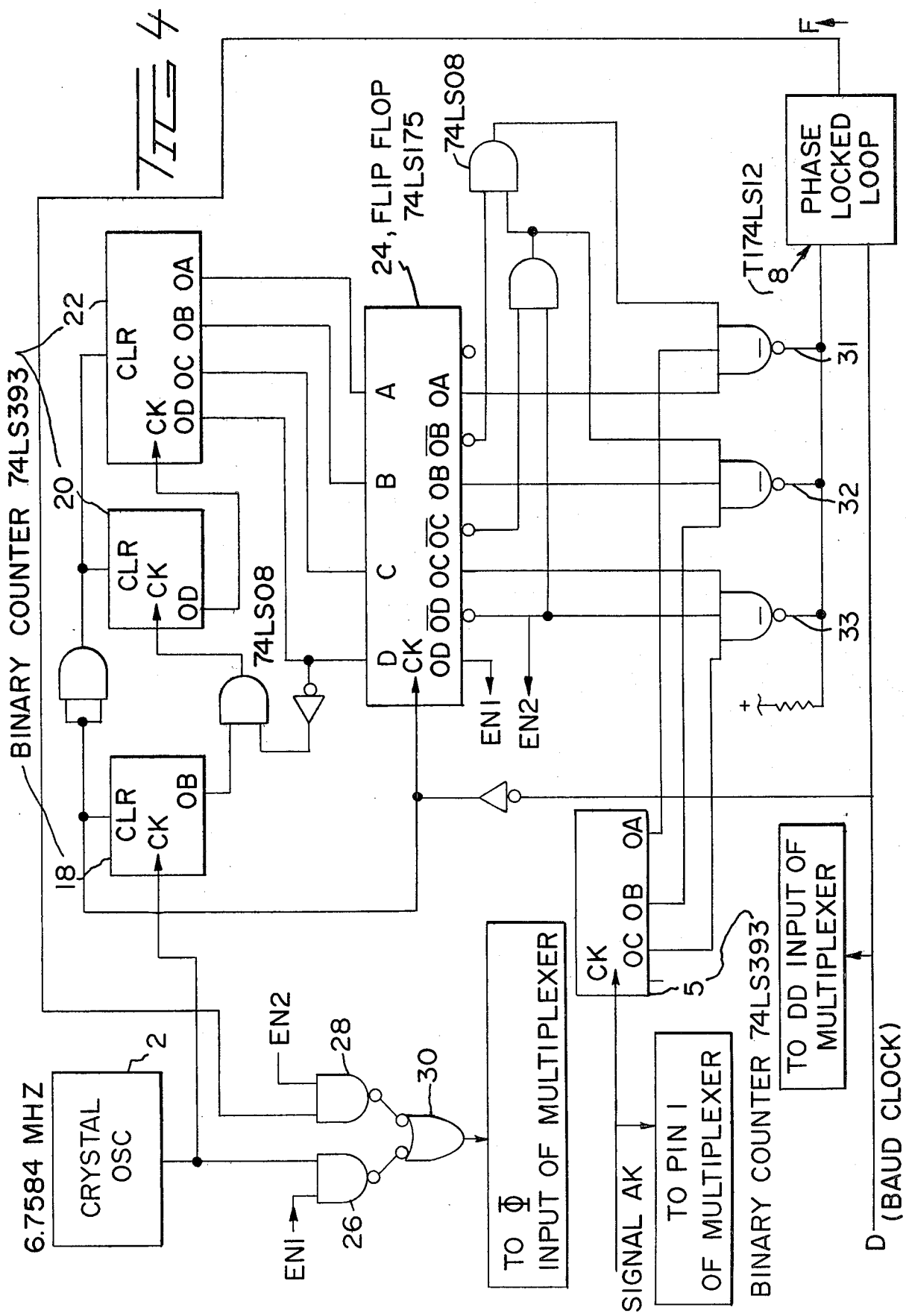

AUTOMATIC DIGITAL CIRCUIT FOR SYNCHRONIZING WITH A VARIABLE BAUD RATE GENERATOR

CROSS REFERENCE TO RELATED APPLICATION

This is a continuation-in-part application of U.S. application Ser. No. 06/137,038 filed Apr. 3, 1980 and now abandoned.

BACKGROUND OF THE INVENTION

1. The Field Of The Invention

The present invention relates to switching means for synchronizing a voltage-controlled oscillator output with a variable input Baud Rate Clock. More specifically, the present invention relates to automatic switching means for electronically switching a Baud rate counter ratio in response to a change in the input signal Baud rate.

2. The Prior Art

In a parallel-to-serial data multiplexing system, it is sometimes desirable that the serial output clock rate be an integer multiple of one of the input circuits. If a crystal oscillator is used, the system frequency is fixed, and the subdivisions of the system frequency which represent the sample frequency is likewise fixed. Furthermore, if the input Baud Rate Clock is variable, a lack of synchronization between the sampling frequency and the input Baud rate may occur, particularly at high Baud rates, which can cause intolerable variation, i.e., "jitter", in the output.

In order to adjust for such fluctuations at high Baud rates, a voltage-controlled oscillator using a Phase Locking Loop to lock its output frequency with the input frequency may be used so that a constant output to input ratio is maintained. The transmitted output is thereby free from jitter. Heretofore, however, no convenient scheme had been devised for adjusting the output frequency whenever the selected input Baud rate is to be changed. The industry, therefore, has been in need of a convenient switching scheme for automatically synchronizing a voltage-controlled oscillator output frequency with a variable input Baud Rate Clock.

SUMMARY OF THE PRESENT INVENTION

The present invention constitutes electronics for synchronizing a multiplexer output frequency with a variable input Baud Rate Clock. For relatively low Baud rates, a crystal oscillator is switched into use, and for higher Baud rates, a Phase Locking Loop is switched into operation. Further electronics pursuant to the present invention are provided to select the Phase Lock Loop Baud rate counter ratio according to the input signal rate, whereby in the relatively high input Baud rate ranges, the Baud rate counter ratio is varied automatically in response to changes in the input Baud rate.

Accordingly, it is an object of the present invention to provide an automatic switching system for synchronizing a voltage controlled oscillator output frequency with a variable input Baud Rate Clock.

A further objective of the present invention is to provide an automatic switching arrangement feature having means for automatic selection of a Phase Lock Loop circuit only for high input Baud rate ranges where synchronization of a multiplexer clock with the input signal clock is needed to ensure a jitter free output.

Still further, it is an objective of the present invention to provide an automatic switching circuit which is readily incorporated into a parallel-to-serial data multiplexing system.

Yet a further objective of the present invention is to provide an automatic switching circuit embodying principles which provide advantage in various instances where a multiplexer serves as part of a network with synchronization to different signals required.

A still further objective of the present invention is to provide an automatic switching arrangement which utilizes relatively simple logic circuitry, and which is reasonably low in cost.

These and other objectives, which will become apparent to one skilled in the art, are achieved in a preferred embodiment which is described in detail below, and which is illustrated in the accompanying diagrams.

BRIEF DESCRIPTION OF THE ACCOMPANYING DRAWINGS

FIG. 3 is a logic diagram of a Phase Lock Loop circuit of the type intended for use in FIG. 2 of the subject invention.

FIG. 4 is a logic diagram of an automatic digital switching system substituted for the manual switching means of FIG. 2 for electronically synchronizing a voltage-controlled oscillator output frequency with a variable input Baud rate.

DETAILED DESCRIPTION OF THE PREFERRED EMBODIMENT

Figure 1:
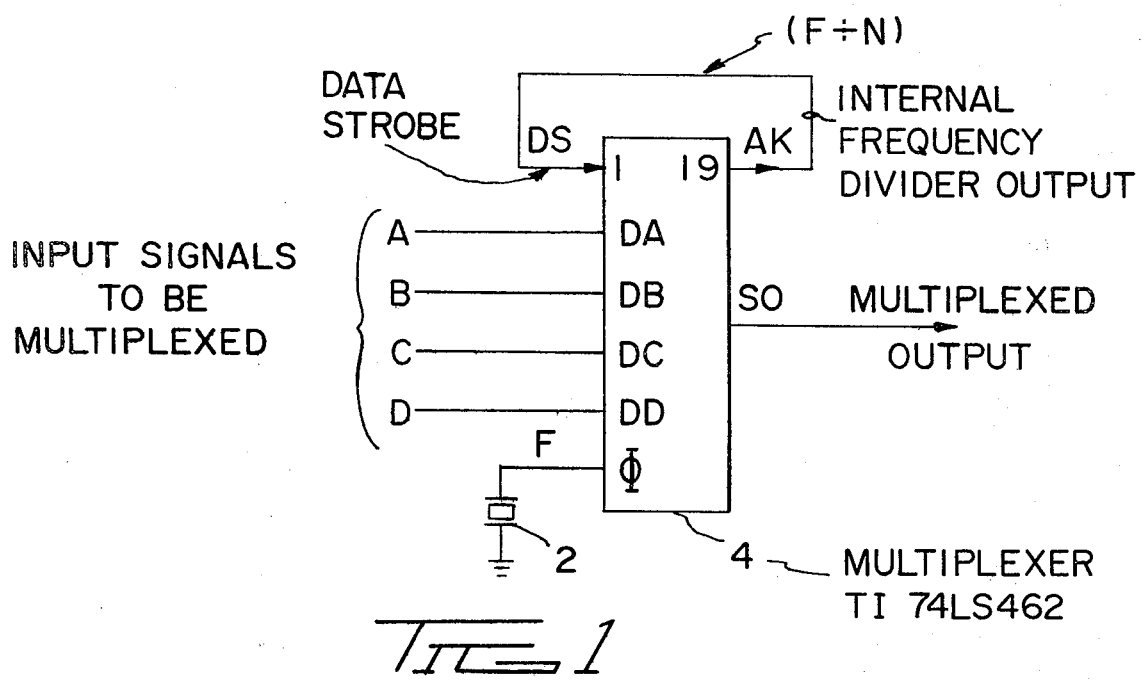
FIG. 1 is a logic diagram showing a general multiplexing scheme using a crystal oscillator.

It is sometimes desirable, in a parallel-to-serial data multiplexing system, that the serial output clock rate be an integer multiple of one of the input circuits to be multiplexed. By way of example, as shown in FIG. 1, let there be four signals, A, B, C, D to be multiplexed, and that one of the signals, D, is a Timing Element or Baud Rate Clock. These signals are supplied to inputs, DA, DB, DC and DD of a digital multiplexer 4, for example, an integrated circuit, IC, part number Tl SN76333, available from Texas Instruments Company, Dallas Tx.

An oscillator 2 generates a frequency F which is fed into the input ∅ of a multiplexer 4. The multiplexer 4 has an internal frequency divider (not shown) which generates output signal AK having a frequency equal to F/N. The signal AK is sent from pin 19 of the multiplexer 4 and resupplied to pin 1 as a data strobe input DS, and this is the frequency of sampling, i.e., inputs A, B, C, D are strobed once every (1÷F/N) seconds.

In the case of Tl SN76333 multiplexer the value of N is equal to 88. Assuming that F is chosen to be 6,758,400 Hz, then (F÷N)=76,800. This frequency, when fed into a binary divider, will give frequencies of 38400, 19200, 9600, 4800, etc. If the oscillator 2 is crystal oscillator, then F is fixed and its subdivisions are also fixed. If the oscillator is a variable oscillator with an adjustment range of say ±25%, then the range of F and its sub-divisions will also be variable within the ±25% limits.

For the purpose of illustration, it is assumed that input D is an input Baud Rate Clock which may have nominal values of 1200, 2400, 4800, 9600, 19200, or 38400. The corresponding Baud Periods are 833, 416, 208, 104, 52, and 26 microseconds. The oscillator 2, designed to use a value of F=6,758,400 Hz giving thus (F/88)=76800, will sample (strobe) the input signals at every (1/76800)=13 microseconds.

At low Baud rates up to 4800, the sampling period of 13 (microseconds) is a small percentage of the Baud Period, and any error resulting from non-synchronization is generally tolerable. At higher Baud rates, such as 9600 or higher, the variation of output due to fluctuation in Baud rates becomes more serious and may be intolerable. For example, at 38400 Baud, the sampled output may be (26±13 usec)=13 to 39 usec.

Figure 2:
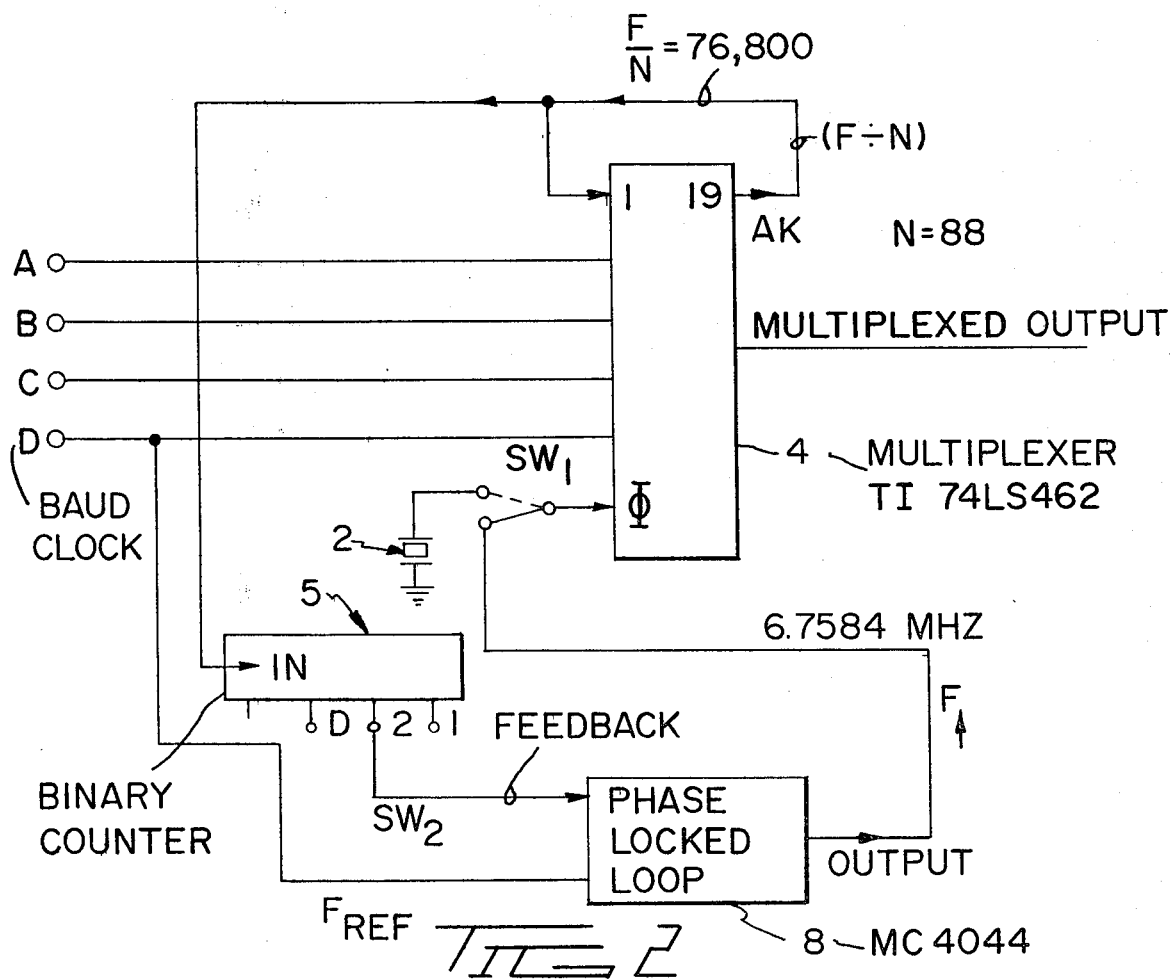
FIG. 2 is a logic diagram of a multiplexing unit having integral manually operated switching means for selecting either a crystal oscillator or a phase locked loop oscillator with a variable input Baud Rate Clock.

In order to correct for such fluctuations at high Baud rates, switch SW1 is actuated manually to substitute the oscillator 2 with a voltage controlled oscillator, using a Phase Locked Loop 8 (FIG. 2) to lock its output signal frequency F with the input Baud Rate Clock D, so that a constant ratio of F/D is maintained and the transmitted output is then free from jitter. If the Baud value of D is known, a switch SW2 as shown in FIG. 2, can be used to select the corresponding divider 1, 2, or D of the output of binary counter 5 to be supplied as a feedback signal to the phase locked loop 8. For Baud rates of less than 9600, switch SW1 is set at a position to use the crystal oscillator 2; for higher Baud rates such as 9600, 19200, 38400, switch SW1 is set to use the Phase Lock Loop 8, and the specific rate is selected by switch SW2. In practice, switches SW1 and SW2 may be ganged as a single-control 4-position switch.

The detailed circuitry of Phase Locked Loop (PLL) 8 is shown in FIG. 3 to include a phase differential comparator 10 having an output coupled to an active filter 13 to feed a charge pump 14 the output of which in turn controls a variable voltage controlled oscillator 12. The phase comparator 10 and charge-pump 14 are both contained inside an integrated circuit 8, part number MC 4044, available from Motorola Company Incorporated, Phoenix, Ariz. The oscillator 12 is an integrated circuit, part number MC 4024, available also from Motorola Company Incorporated.

The above scheme is simple and straight forward. But whenever the Baud rate sampling is to be changed, a manual operation of switches SW1 and SW2 will be required. This is not always convenient, particularly in instances where a number of such units are installed as a group and housed in an enclosed cabinet, and if Baud changes are to be made from time to time after installation.

Thus, FIG. 4 shows that the present invention is designed such that the PLL Baud rate counter ratio is selected or switched electronically and automatically according to the input signal Baud rate, rather than manually by switches SW1 and SW2. The signal AK from the multiplexer 4 is the clock signal (F/N), and is supplied to binary counter 5, integrated circuit part number 74LS393 available from Texas instruments Incorporated. Additional binary counters are shown at 18, 20, and 22. The outputs from OA, OB, OB, OC, OC, OD, OD, of the flip flop register 24, which is integrated circuit part No. 74LS175, available from Texas Instruments Incorporated, are combined with the particular output of binary counter 5, such as outputs OA, OB or OC, through respective, open collector output NAND gates 31, 32, or 33. The output from these NAND gates is the feedback signal supplied to the phase locked loop 8 together with input signal D which is the Baud clock signal, supplied also to the DD input of multiplexer 4.

The output signal F from the phase locked loop 8 is fed to the NAND gate 28. The selection function of switch SW1 of FIG. 2 is replaced by NAND gates 26, 28 and 30. The EN2 input of NAND gate 28 is on if output OD is high, indicating "use PLL". If OD is high, OD is low, EN1 is on, indicating "use crystal osc".

As shown in FIG. 4, a crystal oscillator 2 with a frequency of 6,758,400 H$_2$ is still used. The binary counters 18, 20, 22 are used to count down the 6.75 Mhz clock during the time when the input signal D is high. When D goes low, counting is stopped and the result of the count is transferred to a 4 bit register 24. Calculation shows that nominal values of OA are equal to 9.47 usec, OB=18.94 usec, OC=38.88 usec, and OD=75.75 usec. For signal D, which is a square wave, the half period corresponding to different Baud rates are listed in the table below.

The table shows the expected output readings of counter 22 that are transferred to flip flop register 24. The output of counter 5 is supplied through either of the NAND gates 31, 32, or 33. The particular NAND gate selected is determined by the values of signals from the outputs OA, OB and OC of register 24.

| | | | Counter Reading | |
|---|---|---|---|---|
| Baud | Period | Half Period | Nominal Value | Actual Range |
| 4800 | 208 | 104 | 11 | 8 |
| 9600 | 104 | 52 | 5.5 | 4–7 |
| 19200 | 52 | 26 | 2.75 | 3–2 |
| 38400 | 26 | 13 | 1.375 | 1 |

Note that for Baud rate of 4800 or slower the counters 20 and 22 are disabled from further counting because the line signal of OD from register 24 goes high. The crystal oscillator 2 is switched automatically into the system by operation of gates 26, 28, 30. For Baud rate faster than 4800, the appropriate counter 5 output is gated into the Phase Lock Loop 8. This result of counting of a half period must yield values within a range of 1 through 8. The switching to be done based on the result of the half-period count is as follows:

| Count | Switching |
|---|---|
| 8 | Use crystal oscillator (2) output to the multiplexer (4 of FIG. 2) clock input. Disregard PLL (8). |
| 4–7 | Enable 9600 output of counter 5. Disable 19200 and 38400. |
| 3–2 | Enable 19200 output of counter 5. Disable 38400. |
| 1 | Enable 38400 output of counter 5. |

The tolerance range is roughly ±25%.

From the foregoing, it will be appreciated that PLL is only automatically selected for high Baud rate ranges where synchronization of the multiplexer clock with the input signal clock is needed to ensure jitter-free output. Also, note that the above system is relatively simple in logic circuitry and therefore reasonably low in cost.

While the subject invention has particular utility in the above application, the principles and circuitry herein set forth, are not to be so confined, and may be applicable in order instances. For example, advantage may be gained in utilizing the present switching circuitry where the multiplexer serves as part of a network, with synchronization to different signals required. Other embodiments which utilize the teachings herein set forth are likewise intended to be within the scope of the present invention.

What is claimed is:

1. A digital feedback circuit for synchronizing an oscillator output frequency with a signal input from a variable Baud Rate Clock in order to maintain a fixed input to output frequency ratio, comprising:

first binary means connected to a voltage controlled oscillator having an output frequency for counting down at a rate determined by said voltage controlled oscillator output frequency, and having sequentially activated divider outputs for binary division of said output frequency;

a system clock generating a system clock signal at a preset bit frequency;

second binary means counting down said system clock signal for a period determined by said Baud Rate Clock period;

means for registering the count of said second binary counting means logic means responsive to said registering means for selecting an output from said first binary counting means;

means for connecting the output of said voltage controlled oscillator to an output terminal; and means for comparing phase differential between said selected output of said first binary counting means and said signal input from said variable Baud Rate Clock and generating a voltage level based upon any phase differential therebetween for adjusting said voltage controlled oscillator output frequency.

2. A digital feedback circuit as set forth in claim 1, further comprising:

means for switching said system clock to said output terminal and
    means for outputting said system clock signal and disenabling said voltage controlled oscillator whenever said second binary means count exceeds a specified limit.

3. A digital feedback circuit as set forth in claim 1 wherein said clock generating at said preset bit frequency comprises a crystal oscillator.

4. A digital feedback circuit for synchronizing an oscillator output frequency with a signal input from a variable Baud Rate Clock in order to maintain a fixed input to output frequency ratio, comprising:

first binary means connected to a voltage controlled oscillator having an output frequency voltage for counting down at a rate determined by said controlled oscillator output frequency, and having sequentially activated outputs for binary division of said output frequency;

a crystal oscillator generating a system clock signal at a preset bit frequency;

second binary means for counting down said system clock signal for a period determined by said Baud Rate Clock period;

means registering the count of said second binary counting means logic means responsive to said registering means for selecting an output from said first binary counting means;

means for connecting the output of said voltage controlled oscillator to an output terminal;

means for comparing phase differential between said selected output of said first binary counting means and said signal input from said variable Baud Rate Clock and generating a voltage level based upon any phase differential therebetween for adjusting said voltage controlled oscillator output frequency; and means for switching said system clock signal to said output terminal and disenabling said voltage controlled oscillator whenever said second binary means count exceeds a specified limit.

* * * * *